(12) United States Patent
Li et al.

(10) Patent No.: US 9,336,317 B2
(45) Date of Patent: May 10, 2016

(54) SYSTEM AND METHOD FOR SEARCHING ALIASES ASSOCIATED WITH AN ENTITY

(71) Applicant: INDUSTRIAL TECHNOLOGY RESEARCH INSTITUTE, Hsinchu (TW)

(72) Inventors: Ching-Hsien Li, Kaohsiung (TW); Jason S. Chang, Hsinchu (TW); Jian-Cheng Wu, Yunlin County (TW); Hung-Ting Hsieh, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 166 days.

(21) Appl. No.: 14/222,316

(22) Filed: Mar. 21, 2014

(65) Prior Publication Data

US 2014/0324898 A1    Oct. 30, 2014

(30) Foreign Application Priority Data

Apr. 24, 2013    (TW) .............................. 102114675 A

(51) Int. Cl.
*G06F 17/30*    (2006.01)

(52) U.S. Cl.
CPC ................ *G06F 17/30867* (2013.01)

(58) Field of Classification Search
USPC ................................................ 707/706, 758
See application file for complete search history.

(56) References Cited

U.S. PATENT DOCUMENTS

| | | | |
|---|---|---|---|
| 6,263,335 B1 | 7/2001 | Paik et al. | |
| 7,813,916 B2 | 10/2010 | Bean | |
| 7,925,498 B1 | 4/2011 | Baker et al. | |
| 7,945,691 B2* | 5/2011 | Dharamshi | G06Q 10/10 709/232 |
| 8,001,136 B1 | 8/2011 | Papachristou et al. | |
| 8,161,041 B1 | 4/2012 | Grushetskyy et al. | |
| 8,161,059 B2 | 4/2012 | Guo et al. | |
| 8,392,395 B2* | 3/2013 | Goldman | G06F 17/30716 707/706 |
| 8,392,949 B2* | 3/2013 | Miki | H04N 7/17318 707/706 |
| 8,977,970 B2* | 3/2015 | Mercier | H04L 51/04 707/913 |
| 9,135,238 B2* | 9/2015 | Bunescu | G06F 17/278 |
| 9,146,116 B1* | 9/2015 | Champaneria | G06Q 10/025 |

(Continued)

FOREIGN PATENT DOCUMENTS

| | | |
|---|---|---|
| CN | 101042692 A | 9/2007 |
| CN | 102609512 A | 7/2012 |
| TW | 200729003 | 8/2007 |

OTHER PUBLICATIONS

Intellectual Property Office, Ministry of Economic Affairs, R.O.C., "Office Action", Mar. 18, 2015, Taiwan.

(Continued)

*Primary Examiner* — Kim Nguyen
(74) *Attorney, Agent, or Firm* — Locke Lord LLP; Tim Tingkang Xia, Esq.

(57) ABSTRACT

A search system for collecting aliases associated with an entity name, includes a storage module configured to store at least one first lexical pattern, a search module coupled to the storage module and configured to obtain a plurality of first snippets from a database according to the entity name, and an alias extracting module coupled to the storage module and the search module separately and configured to, according to the entity name and the first lexical pattern, determine whether any first alias exists in the first snippets. If a first alias exists, the alias extracting module extracts it out and stores it in the storage module.

9 Claims, 4 Drawing Sheets

(56) References Cited

U.S. PATENT DOCUMENTS

| | | | |
|---|---|---|---|
| 2006/0059132 A1 | 3/2006 | Zhang | |
| 2011/0055187 A1* | 3/2011 | Cai | G06F 17/3087 707/706 |
| 2012/0324020 A1* | 12/2012 | O'Sullivan | H04L 51/28 709/206 |

OTHER PUBLICATIONS

Carmen Galvez et al., Approximate Personal Name-Matching through Finite-State Graphs, Journal of the American Society for Information Science and Technology, 2007, p. 1-17, 58(13).

G. Tireesha Kumari et al., Automatic Detection of Name Disambiguation and Extracting Aliases for the Personal Name, International Journal of Computational Engineering Research, 2012, p. 1376-1383, vol. 2, Issue. 5.

Danushka Bollegala et al., Automatic Discovery of Personal Name Aliases from the Web, IEEE Transactions on Knowledge and Data Engineering, 2011, p. 831-844, vol. 23, No. 6.

Christian Bøhn et al., Extracting Named Entities and Synonyms from Wikipedia, IEEE International Conference on Advanced Information Networking and Applications, 2010, p. 1300-1307.

Tarique Anwar et al., Web content mining for alias identification Web content mining for alias identification—A first step towards suspect tracking, Center of Excellence in Information Assurance, King Saud University, Riyadh, Saudi Arabia, Jamia Millia Islamia (A Central University), New Delhi, India.

* cited by examiner

SYSTEM AND METHOD FOR SEARCHING ALIASES ASSOCIATED WITH AN ENTITY

CROSS REFERENCE TO RELATED APPLICATION

This non-provisional application claims priority under 35 U.S.C. §119(a) on Patent Application No(s). 102114675 filed in Taiwan, R.O.C. on Apr. 24, 2013, the entire contents of which are hereby incorporated by reference.

TECHNICAL FIELD

The present disclosure relates to a system and a method for searching aliases which are associated with an entity of interest on Internet.

BACKGROUND

As to obtain a complete search result, a relationship or link, which is used for searching information in web pages, of an entity of interest and its all possible aliases is important to business investigation, TV rating statistics and so on. If a user inquires about information of a specific entity, e.g. a person, an object, an organization, a place or even an event, with its official name on Internet, he/she may get an insufficient search result with a search engine which does not have such a relationship or link to improve or enlarge its search ability and range. As an example, if any related snippet or news about the entity "Chow Sing Chi", a famous Hong Kong movie actor/director, is searched only with his name, the search result returned from a search engine may lose the portion associated with other well-known aliases or nicknames such as "Sing Ye", "Chow Sing Sing" or "Sing Tsai" which are not used as inquiries initially. As another example, the entity can also be the famous NBA player "Kobe Bryant", and of which one of well-known aliases or nicknames may be "Black Mamba".

Conventional Internet search engines commonly lack the ability or functionality to collect all possible aliases associated with an entity in advance and to build up such a relationship or link for the task of searching the same theme much widely. The alias or the abbreviation of an entity which caused public interests varies very quickly in a short period of time, and therefore an automatic searching, extracting and collecting aliases mechanism is needed to help a searcher to get a complete search result even merely with a single inquiry name or alias of an entity while surfing on Internet. The more aliases accompanied with the name of an entity are used as inquiries, the more web information related to the entity will be obtained.

SUMMARY

In an embodiment, the present disclosure provides a search system for collecting aliases associated with an entity name. The search system includes a storage module, a search module and an alias extracting module. The search module is coupled to the storage module, and the alias extracting module is coupled to the storage module and the search module separately. The storage module stores at least one first lexical pattern. The search module obtains a plurality of first snippets from a database according to the entity name. The alias extracting module determines whether any first alias exists in the first snippets, according to the entity name and the first lexical pattern. If a first alias exists in the first snippets, the alias extracting module extracts the first alias from the first snippets and stores the first alias in the storage module.

In an embodiment, the present disclosure also provides a search method for collecting aliases associated with an entity name. The method includes the following steps: Obtaining a plurality of first snippets from a database according to the entity name. Determining whether any first alias exists in the first snippets according to the entity name and a first lexical pattern, and if a first alias exists in the first snippets, the first alias is extracted from the first snippets and is stored. The database can be, for example, an internal or external storage equipment of a search engine or a knowledge website with a capability from which searching data can be fetched.

In an embodiment, the present disclosure provides an alias search method including the following steps: Obtaining at least one first alias from a knowledge website according to an entity name. Obtaining a plurality of first snippets from a database according to the entity name and the at least one first alias. Determining whether any second alias exits in the first snippets according to the entity name and a first lexical pattern, and if at least one second alias exits in the first snippets, the at least one second alias is extracted from the first snippets.

BRIEF DESCRIPTION OF THE DRAWINGS

The present disclosure will become more fully understood from the detailed description given herein below and the accompanying drawings which are given by ways of illustration, and thus are not limitative of the present disclosure and wherein.

DETAILED DESCRIPTION

Figure 1:
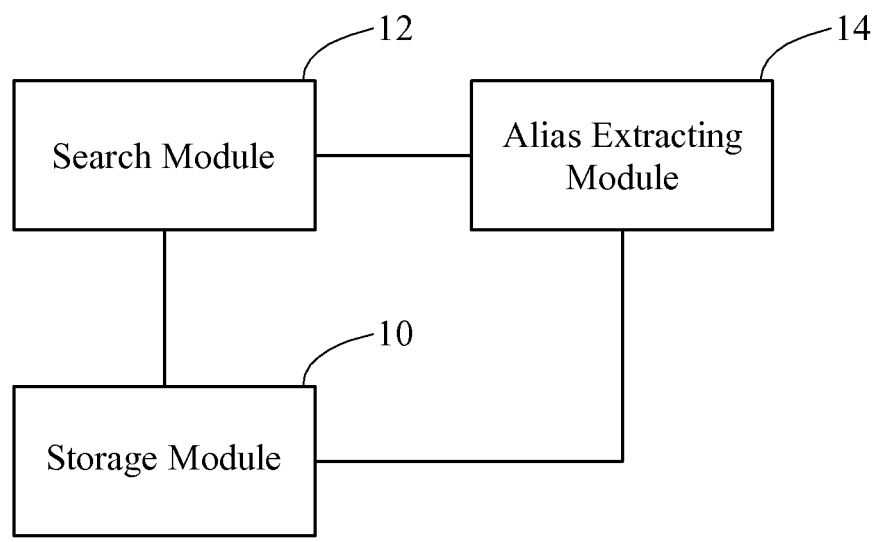
FIG. 1 is a schematic view of a search system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. Please refer to FIG. 1, where a search system 1 in one embodiment of the present disclosure includes a storage module 10, a search module 12 and an alias extracting module 14. Each module is coupled to the other ones as shown to work out jointly. The search system 1 is configured to search with the name of an entity or a theme as an inquiry term on Internet via network to obtain at least a result which may contain at least an alias. The search system 1 can be a sub-system of a conventional search engine, or an independent search engine which has a full functionality, however this should not be a limitation to the present disclosure.

The storage module 10 is configured internally or externally to store results outputted by the search module 12 and the alias extracting module 14. The results mainly include any possible alias and lexical patterns. Lexical pattern can be preset, expended and stored. For instance, lexical pattern is a symbol, a symbol collection, a character, a character set, a string or other type patterns which associate with the entity name. More particularly, lexical pattern can be, for example, prime, bracket, quotation mark, comma, "known as", "a. k. a.", "nicknamed", or any combination thereof.

The search module 12, according to the name of an entity, sends a search request to a search engine, such like Google Search, Yahoo Search, Baidu Search and so on, to obtain web snippets or strings. Specifically, the search module 12 once received an entity name from a user, sends a search request, i.e. a user inquiry associated with the entity name, to an external web search provider, such as a knowledge website, and then receive web snippets or strings from the database of the provider. These snippets or strings are readable and normally composed with characters, symbols and hyperlinks. The search module 12 also can take those snippets or strings much related to the entity. These snippets or strings taken by the search module 12 will be called as snippets hereinafter.

The alias extracting module 14, according to the name of an entity and at least one lexical pattern, determines whether there is any alias, which is associated with the name of an entity, in the snippets. If at least one alias exists in the snippets, the alias extracting module 14 will mark it and then extract it out from the snippets. For example, the alias extracting module 14, according to the relative location relationship between the entity name and the lexical pattern in the snippets, decides the appearance possibility of each candidate alias which has not been confirmed as one desired alias. If the entity name is followed by brackets sandwiching a content (candidate alias) therebetween, the brackets is a lexical pattern, so the content between the brackets could be a possible alias (desired alias) with a high probability. Any lexical pattern can be used to help the alias extracting module 14 to extract aliases.

Assume that a search request is sent to a search engine for obtaining corresponding information of an entity name "Chow Sing Chi" or "Kobe Bryant". Take the entity name "Chow Shin Chi" as an example. One snippet of the returned result will be like as " . . . Chow Sing Chi (Sing Ye), a director of movie (Journey to the West) was called a liar by ex-girlfriend . . . ". The alias extracting module 14, according to the entity name "Chow Sing Chi" and the lexical pattern, decides that the term "Sing Ye" sandwiched between brackets and following the entity name "Chow Sing Chi" directly is probably a desired alias. However, even though the term "Journey to the West" is also sandwiched between brackets, the alias extracting module 14 will not take it as an alias, because the term "Journey to the West" has low probability to serve as an alias of a personal name.

Moreover, most of those snippets are not complete abstracts or sentences, and their length may be too long to extract an alias. In this and some embodiments, the alias extracting module 14 further divides those snippets into many segments in advance. One segment containing the entity name and at least one lexical pattern is much easier for the alias extracting module 14 to extract aliases. For example, the term "Chow Sing Chi (Sing Ye)" is taken as one segment.

In this and some embodiments, the alias extracting module 14 can extract aliases by referring to other criteria such as the probability of the lexicon or pronunciation of the candidate alias serving as an alias or name of a desired entity, the frequency of lexicon or pronunciation of the candidate alias appearing in snippets, or the number of the candidate alias and entity name coexisting in snippets. The criterion implemented in the alias extracting module 14 has a score which can be used for deciding an alias after compared with a corresponding threshold which can be a score pre-defined manually or by machine.

The alias extracting module 14 can give the appearance possibility of a candidate alias a score via calculations of applied criteria. If the score is not less than a pre-defined threshold described as above, the alias extracting module 14 will confirm that there is at least one alias in a snippet and extract the alias. If the score is less than the pre-defined threshold, it indicates that there is no alias in the snippet. Herein, the calculation and comparison processes described as above will repeat the aforementioned alias extraction procedure for a next candidate alias until the alias extracting module 14 confirms that at least one real alias exists in snippets.

Once more aliases are extracted and accumulated, a relationship table of the entity name and the extracted aliases, or of a plurality of name-alias pairs can be built up and stored in the storage module 10. The table can further be renewed or updated by using newly extracted aliases. Therefore, the search module 12 and the alias extracting module 14 can perform next search tasks for the same entity name more efficiently and quickly by using the updated table, and the table may be getting completed via routine feedbacks (newly extracted aliases). As a result, the snippets also can be updated, and more possible aliases can be extracted until the storage module 10 saturates.

On the other hand, different languages may need to be dealt with in the snippet simultaneously, so the alias extracting module 14 takes the phonetic feature, e.g. pinyin or lexicon of the entity name, or the pronunciation or lexicon of the extracted alias as a new search request in corporation with the ways described above to mark and extract the possible aliases.

Figure 2:
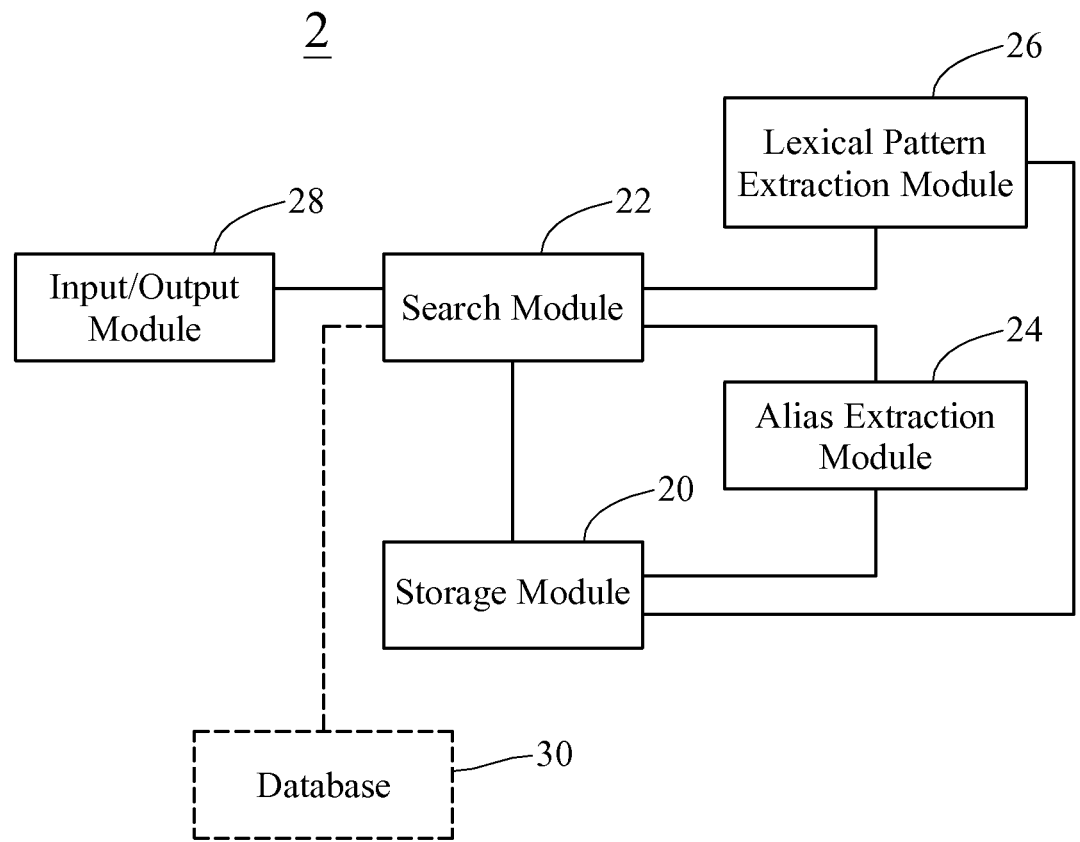
FIG. 2 is a schematic view of a search system according to an embodiment of the present disclosure.

Furthermore, by a training or learning process and other additional modules, the lexical patterns can be automatically extracted from snippets and accumulated by cycles. Please refer to FIG. 2, which illustrates a search system 2 in an embodiment of the present disclosure. Based on the search system 1, the search system 2 includes a storage module 20, a search module 22, an alias extracting module 24, a lexical pattern extracting module 26 and an input/output module 28. The lexical pattern extracting module 26 is coupled separately to the storage module 20 and the search module 22, and the input/output module 28 is coupled to the search module 22. The communication among the storage module 20, the search module 22 and the alias extracting module 24 is the same as that among the storage module 10, the search module 12 and the alias extracting module 14 in FIG. 1.

The storage module 20 can store names of entities, aliases associated with the entities, relationship tables, name-alias pairs and known lexical patterns. The search module 22 can send a search request, i.e. an inquiry term, to a search website according to an entity name or a known alias of the entity name, to obtain snippets from the database 30 of the search website which can be internal or external database. The alias extracting module 24 can extract more aliases from snippets according to the entity name or the known alias, and lexical patterns.

The lexical pattern extracting module 26 can extract, update and accumulate lexical patterns automatically. The search module 22, according to an entity name, at least one alias of the entity and even a lexical pattern, can obtain more snippets from the database 30 to update the content of the storage module 20 for user's reference. Relationship tables or name-alias pairs can be preset to avoid any error occurring while snippets, aliases or lexical patterns are accumulated. Typical name-alias pairs or well-known aliases can be obtained one by one or be batch-downloaded from the database 30 or a knowledge website, and respectively be taken as an inquiry seed for the search module 22 to search for more related snippets. By the same way, the lexical pattern extracting module 26 can further extract and accumulate more lexical patterns from obtained snippets by cycles according to an entity name and at least one alias.

For example, a name-alias pair can be obtained from the database 30 or a knowledge website such as Wikipedia, Baidu and so on. In an embodiment of Wikipedia website, its web page generally presents at least one typical or most used alias associated with a famous person or entity, and whereby the alias can be paired up with the name of famous person or entity to be a name-alias pair. This will help the alias extracting module 24 to extract other aliases later. Aliases on the web page of Wikipedia website are usually behind and closed to the entity name, or are just right after the term of "nicknamed" or "known as", so that they are easy to be identified and to be extracted out. Also, the web page of Wikipedia website usually includes redirection hyperlinks of related information of the entity name linking to other web pages, and mention marks associated with the entity name for providing further introduction, and these hyperlinks and marks are also helpful to extract aliases. The alias and the entity name or the name-alias pair can be stored in the storage module 20, and the new lexical patterns obtained by the lexical pattern extracting module 26 can also be accumulated in the storage module 20. The search system 2 may, but not limit to, extract aliases and accumulates lexical patterns at the same time.

The input/output module 28 coupled to the search module 22 is configured to send a user inquiry to the search module 22 and to present a search result returned from the search module 22. The input/output module 28 is usually a keyboard, a mouse or a touch panel to input inquiries, and even includes a monitor to present search results. The user inquiry is obtained by entering a key work such as an entity name.

In a training or learning process of the present disclosure, if the alias "Sing Ye" of the entity name "Chow Sing Chi" is known, the search module 22 can take it as a search request to obtain corresponding snippets from the database 30 of a search website or a network. The lexical pattern extracting module 26 can then sort all possible lexical patterns in these snippets according to the relative locations or connection between, or the string attributes of the entity name "Chow Sing Chi" and the alias "Sing Ye". Subsequently, according to the frequency of lexicon or pronunciation of the candidate lexical pattern appearing in snippets, the number of lexicon or pronunciation of the entity name and candidate alias coexisting in the candidate lexical patterns, or the accuracy of lexicon or pronunciation of the lexical pattern matching that of a standard template of the entity name and the alias, the lexical pattern extracting module 26 can identify and extract the lexical pattern as if the lexical pattern satisfies a pre-defined threshold. According to different language and usage, the lexical patterns may be various. The storage module 20 will store or update these lexical patterns after every process is completed.

The threshold or pre-defined score to decide lexical patterns may be adjusted any time to a reasonable level which depends on real situations. The number of lexical patterns once is saturated or there is nothing new to update, so the training or learning process may stop unless the user inquiry or the entity name is changed.

For example, a user wants to search for related snippets about an entity name, e.g., "Chow Sing Chi", and he/she inputs the entity name via the input/output module 28 to the search module 22. The search module 22 will first determines whether a name-alias pair or at least one lexical pattern is already stored in the storage module 20. If not, the search module 22 sends a search request only having the entity name to a search website or a native/public network and obtains corresponding snippets or strings returned from the database 30 of the website of the network. If at least one lexical pattern is stored, the search module 22 also sends a search request only having the entity name to a search website or a network and obtains corresponding snippets or strings returned from the database 30. Alternately, if at least one lexical pattern is stored, the search module 22 directly integrates the search request and the lexical pattern to search for more snippets. For example, if the lexical patterns "(", ")" and "known as" are stored in the storage module 20, a search request sent to the search module 22 will include the entity name and the lexical patterns. The related snippets can be updated any time if the search request is out of date.

The alias extracting module 24 extracts any possible alias in snippets returned from the database 30 of a search website provider, according to the entity name and known lexical patterns. In the example of the entity name "Chow Sing Chi", one of the snippets may be like " . . . Chow Sing Chi, known as Sing Ye, the director of . . . ", where the term "Sing Ye" is regarded as an alias of the entity name "Chow Sing Chi" according to the known lexical pattern "known as". Therefore, the alias extracting module 24 recognizes and extracts the alias. Similarly, another snippet may be like " . . . Chow Sing Chi (Stephen Chow), the director of . . . ", where the "Stephen Chow" is regarded as another alias or name of the entity name "Chow Sing Chi" according to the known lexical patterns "("and ")". Therefore, the alias extracting module 24 also recognizes and extracts the alias. In this way, the alias extracting module 24 will build up relationships among the entity name and these aliases, and save them in the storage module 20. The search module 22 may, besides the entity name, take more known aliases and/or lexical patterns as search requests for obtaining more snippets, so as to accumulate the search result by the successive searching and updating.

If enough aliases, lexical patterns and relationships have been stored in the storage module 20, the search module 22 once received a user inquiry from a user via the input/output module 28, will send a search request to the database 30 according to these aliases and the entity name to obtain all possible snippets. The obtained snippets from the database 30 will be presented to the user via the input/output module 28.

The alias extracting module 24 and the lexical pattern extracting module 26 of the present disclosure also process a backstage operation, i.e., the training or learning process. When the input/output module 28 is idle, i.e., no inquiry is input, the two modules 24 and 26 can automatically start a processing loop to recognize and extract aliases and lexical patterns in every snippets, and meanwhile the search module 22 will update inquiries in real time according to the search result, until the numbers of aliases and lexical patterns are saturated, so as to speed up the accumulation of aliases and lexical patterns.

In general, the present disclosure has disclosed the search systems 1 and 2 in detail as above, a person having ordinary skill in the art should realize the spirit and scope and may implement them to his/her various modifications. Below, two search methods of the present disclosure will be described in conjunction with the search systems 1 and 2.

Figure 3:
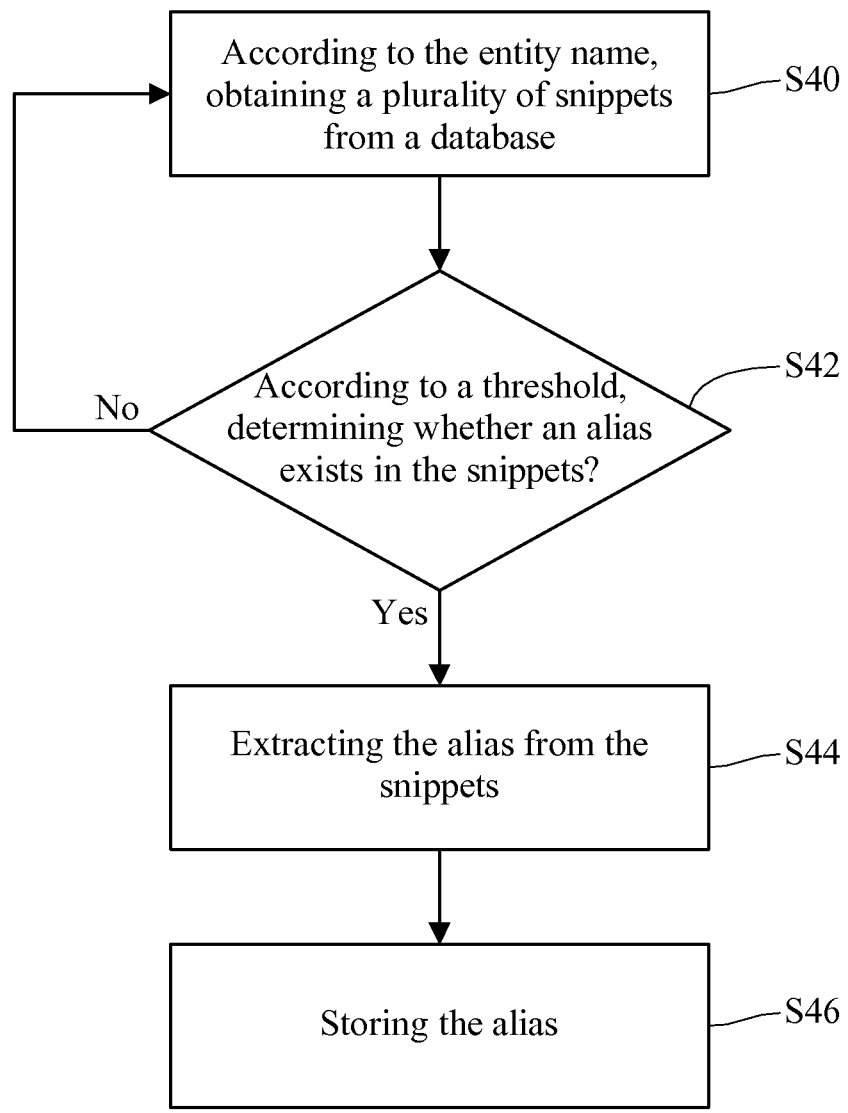
FIG. 3 is a flow chart of an alias extracting process according to the present disclosure.

FIG. 3 illustrates an alias extracting method of the present disclosure. The alias extracting method includes the following steps. In Step S40, the search module 22, according to at least one known entity name, sends search requests to a search website and obtains many web abstracts or snippets associated with the entity name from the database 30 of the search website, i.e., an external database such as a database of an external search engine or an external document database. For example, the search request has the entity name "Chow Sing Chi", a well-known alias of the entity name, or the entity name "Chow Sing Chi" plus the lexical pattern "as called". Subsequently, the alias extracting module 24 in Step S42, according to the entity name and at least one known lexical pattern, recognizes and determines whether at least one alias associated with the entity name exits in the snippets returned from the database 30. In other words, the alias extracting module 24 determines the existence of alias according to a threshold of criteria. If an alias, e.g. an alias "Sing Ye", exits in the snippets and satisfies the threshold, the alias extracting module 24 extracts the alias in Step S44 and saves it in the storage module 20 in Step S46, otherwise returns to treat the next snippet until all snippets have been processed.

Figure 4:
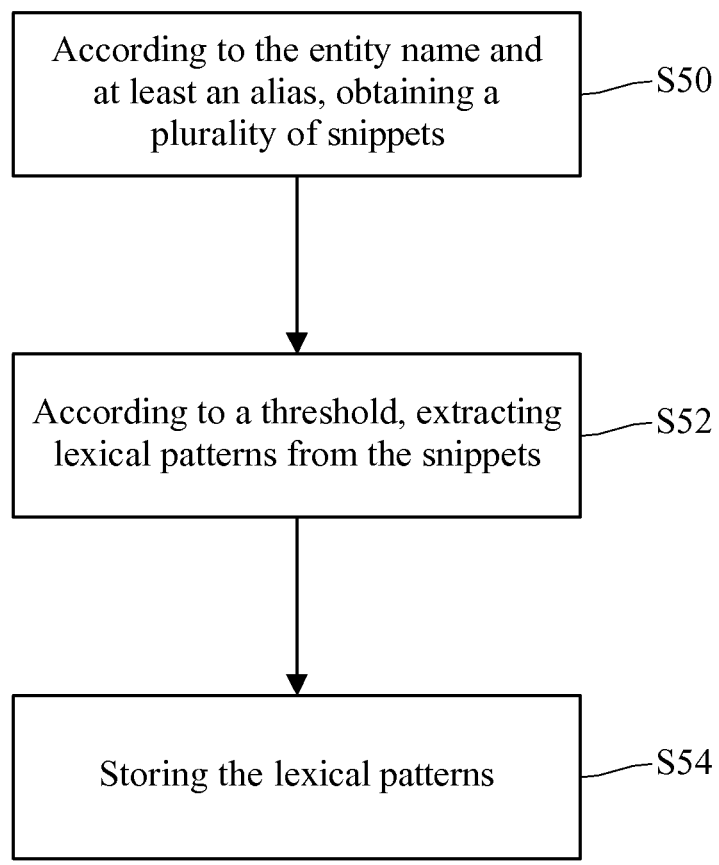
FIG. 4 is a flow chart of a lexical pattern extracting process according to the present disclosure.

Moreover, FIG. 4 illustrates a lexical pattern extracting method of the present disclosure. This method is applicable to collect lexical patterns in a training or learning phase, i.e., the input/output module 28 is idle. In Step S50, the lexical pattern extracting module 26, according to the entity name and at least one known alias associated with the entity name, obtains snippets from the database 30. Subsequently, the lexical pattern extracting module 26 determines and extracts any possible lexical pattern according to a threshold of other criteria in Step S52, and saves the extracted lexical pattern in the storage module 20 to update the content of the storage module 20 in Step S54 until the number of the lexical patterns in the storage module 20 is saturated.

As set forth above, the present disclosure can automatically search and obtain any possible snippet of an entity not only with the entity name but also with unknown aliases of the entity name as search requests.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A search system for collecting aliases associated with an entity name, comprising:
   a processor; and
   a memory storing a plurality of modules executable at the processor, wherein the modules comprise:
   a storage module configured to store at least one first lexical pattern;
   a search module coupled to the storage module, configured to obtain a plurality of first snippets from a database according to the entity name;
   an alias extracting module separately coupled to the storage module and the search module, configured to determine whether any first alias exists in the first snippets according to the entity name and the at least one first lexical pattern, wherein if a first alias exists in the first snippets, the alias extracting module extracts the first alias from the first snippets and stores the first alias in the storage module, and the search module further according to the first lexical pattern or the first alias, obtains a plurality of second snippets from the database and stores the obtained second snippets in the storage module to update the first snippets; and
   a lexical pattern extracting module coupled separately to the storage module and the search module, configured to extract at least one second lexical pattern from the plurality of second snippets returned from the database according to a threshold, the entity name and the first alias, and store the extracted at least one second lexical pattern in the storage module to update the first lexical pattern, wherein the threshold is defined by one of a frequency of lexicon or pronunciation of the second lexical pattern appearing in the second snippets, an accuracy of lexicon or pronunciation of the second lexical pattern matching that of a standard template, and a number of lexicon or pronunciation of the first alias and the entity name coexisting in the at least one second lexical pattern.

2. The search system as claimed in claim 1, further comprising:
   an input/output module coupled to the search module, configured to provide the entity name and display the first snippets.

3. The search system as claimed in claim 1, wherein the alias extracting module according to a threshold, determines whether any first alias exists in the first snippets.

4. The search system as claimed in claim 3, wherein the threshold is defined by one of a frequency of lexicon or pronunciation of the first alias appearing in the first snippets, a number of lexicon or pronunciation of the first alias and the entity name which co-exist, and a probability of lexicon or pronunciation of the first alias serving as the entity name.

5. A search method for collecting aliases associated with an entity name, comprising:
   obtaining, by a search module executed at a processor, a plurality of first snippets from a database according to the entity name;
   determining, by an alias extracting module executed at the processor, whether any first alias exists in the first snippets according to the entity name and a first lexical pattern;
   if a first alias exists in the first snippets, extracting, by the alias extracting module, the first alias from the first snippets and storing the extracted first alias in a storage module;
   obtaining, by the search module, a plurality of second snippets from the database according to the first lexical pattern or the first alias, and storing the obtained second snippets in the storage module to update the first snippets;
   extracting, by a lexical pattern extracting module executed at the processor, at least one second lexical pattern from the plurality of second snippets returned from the database according to a threshold, the entity name and the first alias, wherein the threshold is defined by one of a frequency of lexicon or pronunciation of the second lexical pattern appearing in the second snippets, an accuracy of lexicon or pronunciation of the second lexical pattern matching that of a standard template, and a number of lexicon or pronunciation of the first alias and the entity name coexisting in the at least one second lexical pattern; and
   storing the at least one second lexical pattern in the storage module to update the first lexical pattern.

6. The search method as claimed in claim 5, wherein the step of determining whether any first alias exists in the first snippets is depended on a threshold.

7. The search method as claimed in claim 6, wherein the threshold is defined by one of a frequency of lexicon or pronunciation of the first alias appearing in the first snippets, a number of lexicon or pronunciation of the first alias and the entity name coexisting in the first snippets, and a probability of lexicon or pronunciation of the first alias serving as that of the entity name.

8. The search method as claimed in claim 5, further comprising:
receiving the entity name and displaying the first snippets.

9. An alias search method comprising:
obtaining at least one first alias from a knowledge website according to an entity name;
obtaining, by a search module executed at a processor, a plurality of first snippets from a database according to the entity name and the first alias;
determining, by an alias extracting module executed at the processor, whether any second alias exists in the first snippets according to the entity name and a first lexical pattern;
if a second alias exists in the first snippets, extracting, by the alias extracting module, the second alias from the first snippets;
obtaining, by the search module, a plurality of second snippets from the database according to the entity name, the first alias and the second alias;
extracting, by a lexical pattern extracting module executed at the processor, at least one second lexical pattern from the second snippets according to a threshold, wherein the threshold is defined by one of a frequency of lexicon or pronunciation of the second lexical pattern appearing in the second snippets, an accuracy of lexicon or pronunciation of the second lexical pattern matching that of a standard template, and a number of lexicon or pronunciation of the first alias and the entity name coexisting in the at least one second lexical pattern; and
storing the extracted second lexical pattern in a storage module to update the first lexical pattern.

* * * * *